July 4, 1961
V. D. HILLARD ET AL
2,990,916
AUTOMATIC TROLLEY LUBRICATOR
Filed Aug. 25, 1958
3 Sheets-Sheet 1
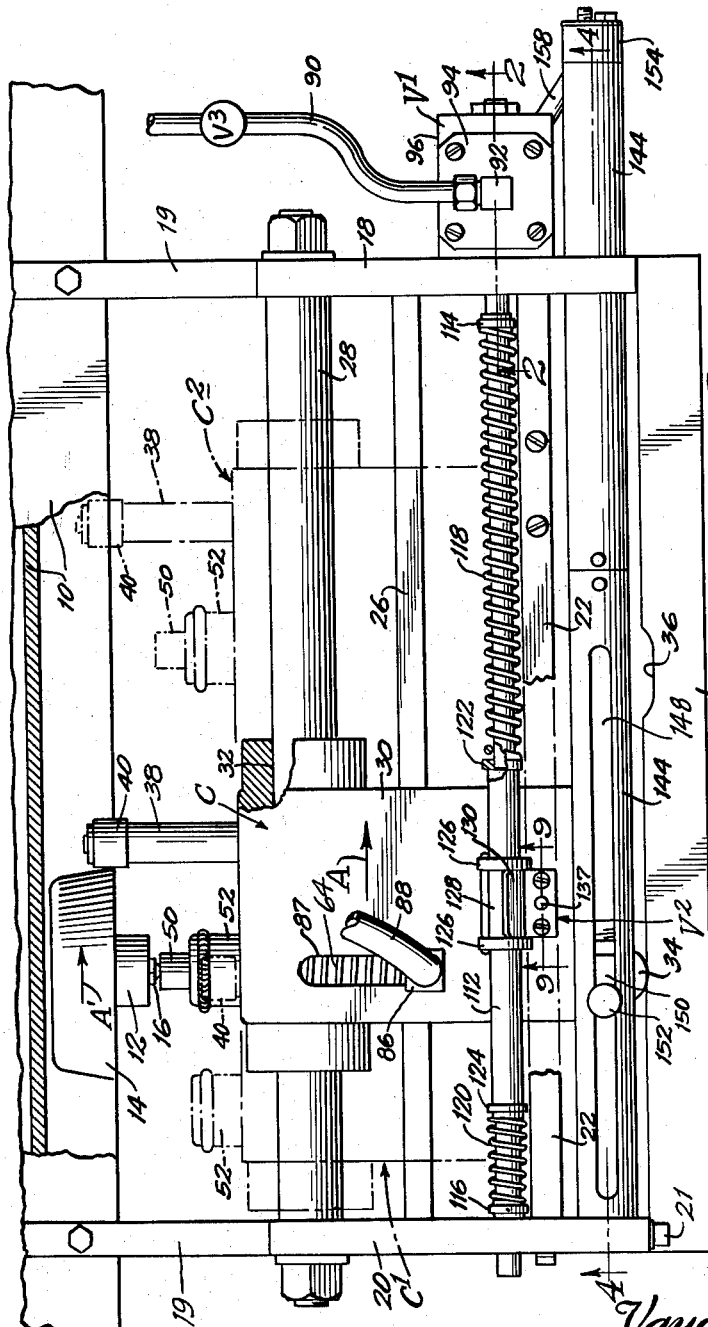
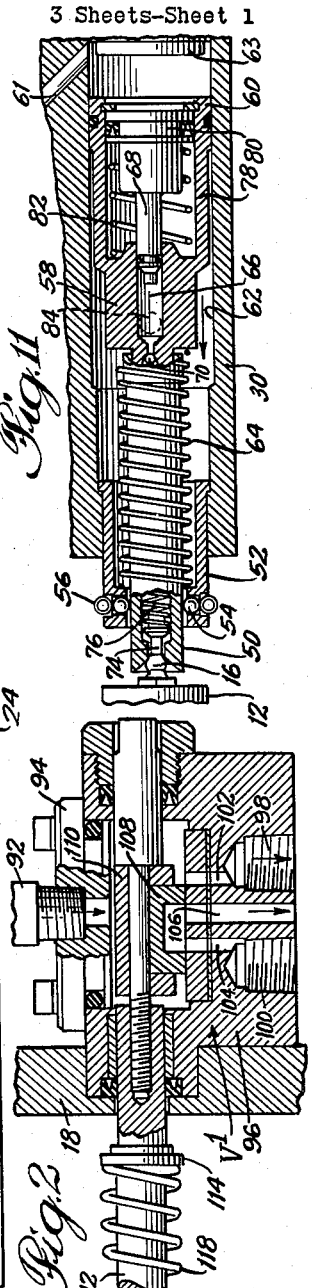
INVENTORS:
Vaughn D. Hillard
and Philip L. Hyatt,
BY Bair, Freeman & Molinare
ATTORNEYS.

July 4, 1961  V. D. HILLARD ET AL  2,990,916
AUTOMATIC TROLLEY LUBRICATOR
Filed Aug. 25, 1958  3 Sheets-Sheet 2
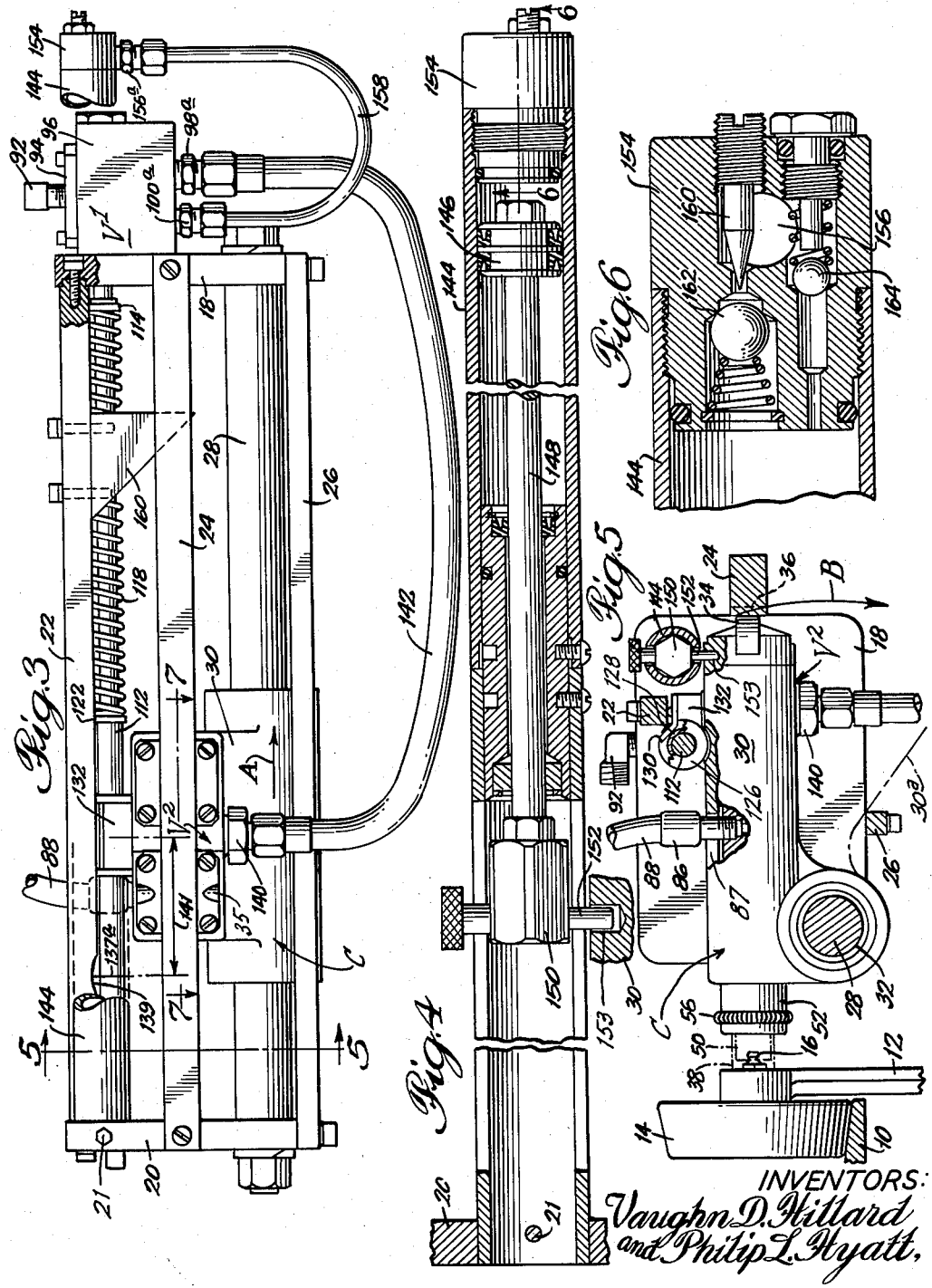
INVENTORS:
Vaughn D. Hillard
and Philip L. Hyatt,
BY Bair, Freeman & Molinare
ATTORNEYS.

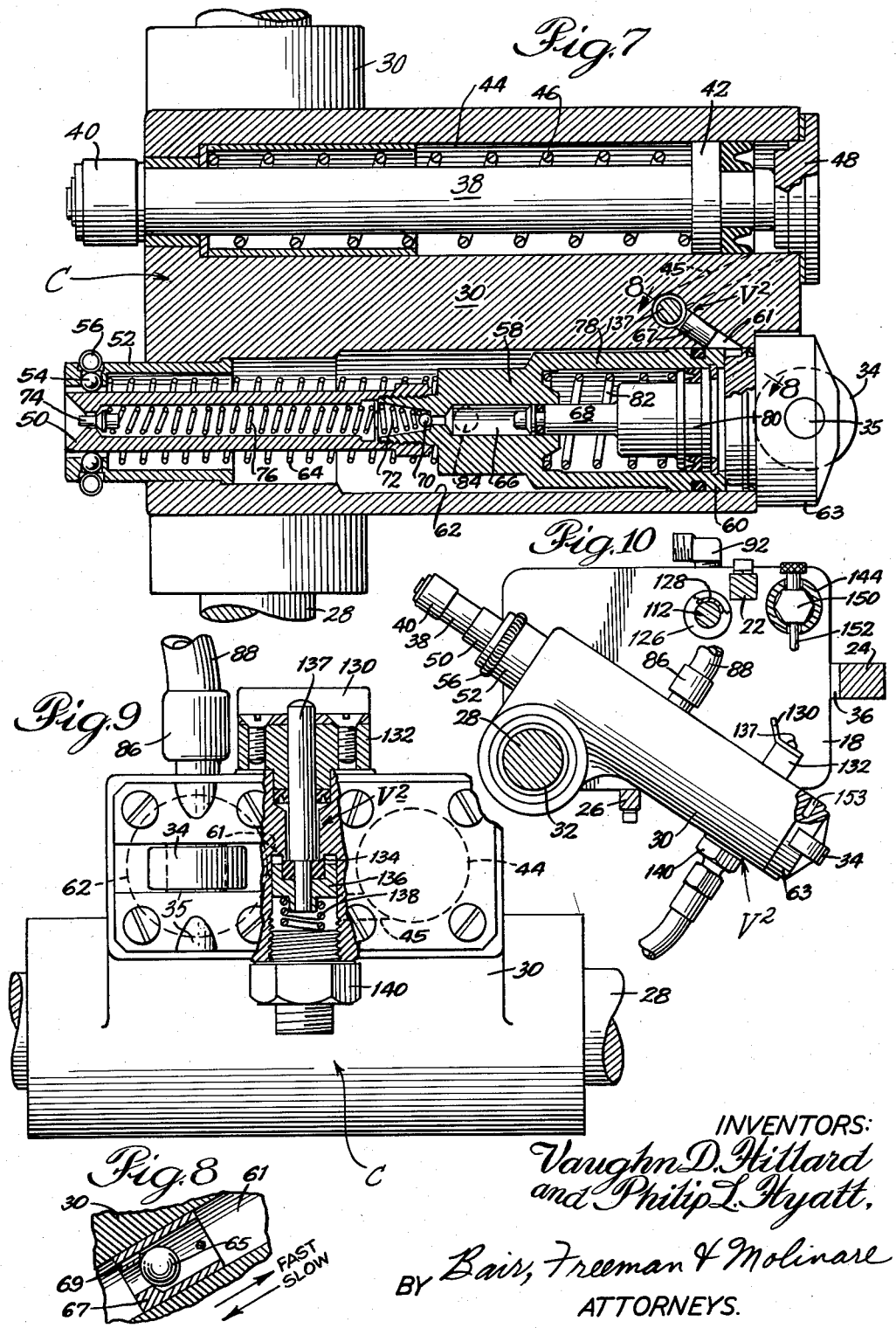

United States Patent Office 2,990,916
Patented July 4, 1961

2,990,916
AUTOMATIC TROLLEY LUBRICATOR
Vaughn D. Hillard, Montpelier, and Philip L. Hyatt, Bryan, Ohio, assignors to The Aro Equipment Corporation, Bryan, Ohio, a corporation of Ohio
Filed Aug. 25, 1958, Ser. No. 757,032
11 Claims. (Cl. 184—15)

This invention relates to an automatic lubricator for trolley wheels such as those forming part of an assembly or painting conveyor system or the like, and contemplates the provision of a lubricator which will automatically lubricate each trolley wheel as it passes the lubricator.

One object of our invention is to provide a lubricator including a carriage having trolley engaging means for moving the carriage in synchronism with a passing trolley, having lubricating means for the bearing of the trolley wheel which is automatically extended to contact a lubricant nozzle of the lubricating means with a lubricant fitting on the trolley wheel bearing, and is automatically retracted after a period of travel at which time the wheel engaging means is also retracted so that the carriage may be returned to its initial position.

Another object is to provide guide means for the carriage parallel with the trolley track and along which the carriage is slid by the engagement of the wheel engaging means with the trolley wheel as the trolley wheel travels past the guide means.

Still another object is to provide pneumatic means to move the trolley wheel engaging means out to trolley wheel engaging position, and to retract it from such position, both operations being automatically performed dependent upon the position of the carriage relative to the guide means, and to also provide pneumatic means to extend and retract the lubricating means and to actuate it through its lubricating cycle depending on its position along the guide means.

A further object is to provide pneumatic means to return the carriage to its initial position which is automatically actuated by the position of the carriage at the end of the lubricating operation.

An additional object is to provide the carriage so pivoted on the guide means that if it is carried too far therealong by failure of the trolley wheel engaging means to retract, the carriage will swing down under the force of gravity to an out-of-the-way position of the trolley wheel engaging means and the lubricant nozzle and remain in a safe out-of-operation position until such time as the difficulty causing the malfunctioning is remedied and the lubricator readjusted to its position for automatic operation.

With these and other objects in view, our invention consists in the construction, arrangement and combination of the various parts of our automatic trolley lubricator, whereby the objects above contemplated are attained, as hereinafter more fully set forth, pointed out in our claims and illustrated in detail on the accompanying drawings, wherein:

FIG. 1 is a plan view of our automatic trolley lubricator and a trolley track and wheel with which it is associated, parts being broken away and other parts being shown in section;

FIG. 2 is an enlarged vertical sectional view on the line 2—2 of FIG. 1 showing a master control valve for certain pneumatic elements of our lubricator;

FIG. 3 is a side elevation of our lubricator, looking upwardly toward FIG. 1;

FIG. 4 is an enlarged vertical sectional view through a pneumatically operated return cylinder and piston taken on the line 4—4 of FIG. 1;

FIG. 5 is a vertical sectional view on the line 5—5 of FIG. 3;

FIG. 6 is an enlarged sectional view on the line 6—6 of FIG. 4 showing a valving arrangement for the air to and from the return cylinder;

FIG. 7 is an enlarged horizontal sectional view on the line 7—7 of FIG. 3 (and turned 90°);

FIG. 8 is an enlarged detail sectional view on the line 8—8 of FIG. 7;

FIG. 9 is an enlargement of a portion of FIG. 3 showing the parts in side elevation with the exception of certain sectioned portions which are taken on the line 9—9 of FIG. 1 to show a lubricator control valve;

FIG. 10 is a view similar to FIG. 5 showing the lubricator dropped down to a "safety" position; and FIG. 11 is a view similar to a portion of FIG. 7 except on a reduced scale and shows the lubricator partially operated.

On the accompanying drawings we have used the reference numeral 10 to indicate a trolley track of a paint or assembly line or the like, the track being "I" beam construction and having the usual trolley comprising a hanger 12 and trolley wheel 14 provided with a lubricant fitting 16. These hangers are usually of forked type having two trolley wheels 14, one on each side of the web of the trolley track 10 and suspend pieces of machinery or the like for assembly, painting, etc. One of the maintenance problems is to lubricate the bearings of the trolley wheels economically. They can be lubricated by hand using a lubricant gun but this requires considerable time of a workman as trolley wheels which are in constant movement require lubrication each eight or ten hours.

Our present invention contemplates an automatic lubricator which may be placed in operation by merely turning on the supply of compressed air to the lubricator, and may be turned off again after all the trolley wheels on a complete conveyor chain have been lubricated.

Our lubricator includes a front end plate 18 and a back end plate 20 which may be supported on the track 10 by brackets 19 and are connected together by bars 22, 24 and 26 and a connecting rod 28. The connecting rod 28 and the connecting bar 24 provided guide means for a carriage indicated generally at C. The carriage C includes a traveler body 30 having a bore 32 surrounding the connecting rod 28 and a roller 34 to travel along the inner vertical surface of the connecting bar 24 as shown in FIG. 1. This inner surface has a notch 36 at one point to receive the roller 34 mounted on a pin 35 for a purpose which will hereinafter appear.

In FIG. 1 the carriage C is shown in an intermediate position of travel, its initial position being shown dotted at $C^1$ and its safety position shown dotted at $C^2$. Both of these positions will be hereinafter referred to. The carriage C is being moved along the connecting rod 28 in FIG. 1 (arrow A) by means of a trolley engaging means such as a roller 40 mounted on a projector rod 38 for engaging the trolley wheel 14. The trolley wheel, of course, travels in the same direction as the carriage C as indicated by the arrow A'.

Referring to FIG. 7, the projector rod 38 extends into a cylinder 44 and terminates in a piston 42 for projecting the rod from the position of FIG. 7 to the position of FIG. 1 by the introduction of compressed air into the cylinder 44 between the piston 42 and a cylinder head 48.

Referring again to FIG. 1, a lubricant nozzle 50 projects from a sleeve 52 and is coacting with the lubricant fitting 16 to deliver lubricant thereto. In FIG. 7, the nozzle 50 is shown loosely guided in the sleeve 52 by a plurality of balls 54 movable in radial openings of the sleeve and constrained inwardly to frictionally engage the lubricant nozzle by a garter spring 56. The inner end of the lubricant nozzle 50 is connected to a sleeve 58 constituting at its right-hand end a piston 60 slidable in a cylinder 62. The piston 60 is relatively short axially so as to permit slight lateral movement of the nozzle 50 in the sleeve 52 to allow for slight misalignment of the lubricant fittings 16 relative to the axis of the cylinder 62 and insure proper coaction of the lubricant nozzle 50 with the lubricant fittings 16 of the successive trolley wheels 14 as they are lubricated by our lubricator. The sleeve 58 is normally in the position shown in FIG. 7 under the action of a light return spring 64.

The lubricating means (FIG. 7) comprises a lubricant cylinder 66 in the sleeve 58 in which a lubricant plunger 68 is slidably mounted, a check valve 70 leading therefrom to the nozzle 50 and normally seated under the action of a spring 72, and a check valve 74 in the nozzle 50 normally seated by a spring 76 and adapted to be opened by contact with the lubricant fittings 16 as shown in FIG. 11. The lubricant cylinder 66 is provided with an inlet port 84 from an inlet fitting 86 to which a lubricant hose 88 is attached, and any suitable means is provided for supplying lubricant thereto under pressure.

Pneumatic means is provided for actuating the lubricant plunger 68 comprising an air cylinder 78 in the sleeve 58 in which is slidable an air piston 80 normally held in the position of FIG. 7 by a heavy return spring 82.

A master valve $V^1$ for controlling the projector rod 38 and a pneumatic carriage return means which will be later described, is provided to which air is supplied from an air line 90 and the air may be turned on or off by a valve $V^3$. The line 90 extends to a fitting 92 mounted in a cover plate 94 for a valve body 96 of the valve $V^1$, the valve body being provided with a pair of ports 98 and 100, passageways 102 and 104 connect with the ports 98 and 100 respectively, and the body 96 has an exhaust passageway 106 to atmosphere. A slide valve block 108 as shown in FIG. 2 is adapted to connect the passageway 102 with the interior of the valve body 96 and thereby the air line 90 through the fitting 92, and the passageway 104 with the exhaust passageway 106. When the valve block 108 is in the opposite position (slid to the right) it connects 102 with 106 and 104 with the interior of the valve body 96.

A valve block carrier 110 coacts with the slide valve block 108 to move it in response to the movements of a valve actuating rod 112 having its ends slidably mounted in the end plates 18 and 20. Collars 114 and 116 are secured to the valve actuating rod 112, and springs 118 and 120 are engaged thereagainst and interposed between them and washers 122 and 124 respectively, which are normally against shoulders of an enlarged central portion of the rod 112 as shown in section adjacent the central portion of FIG. 1.

A spool comprising two flanges 126 and a sleeve 128 is slidable on the rod 112 and is adapted to be slid by a clip 130 secured to the upper surface of a valve head 132 of a lubricant control valve $V^2$ which is shown in detail in FIG. 9. The valve $V^2$ comprises a valve seat 134 against which a valve disc 136 is normally seated by a spring 138. A fitting 140 supplies air to the valve 134—136 from an air hose 142 (see FIG. 3) connected by a fitting 98ª to the port 98, the hose 142 being flexible so that the carriage C may move along its guide means while the master valve $V^1$ remains stationary. A valve stem 137 is adapted for opening the valve disc 136 relative to the seat 134, and its upper end slides along the lower surface of the connecting bar 22 which serves as an actuator therefor by permitting the spring 138 to close the valve in the normal position of the carriage C relative to the connecting rod 28 which position is shown at $C^1$ in FIG. 1. In FIG. 3 the center of the axis of the stem 137 is illustrated at 137ª in such initial position $C^1$, and it will be noted at this position there is a notch 139 in the lower surface of the connecting bar 22. The carriage (solid line position C in FIGS. 1 and 3) is shown advanced from the position $C^1$ the distance indicated by the dimension line 141 in FIG. 3. The connecting bar 22 is also provided with a triangular safety cam 160, the purpose of which will hereinafter appear.

Pneumatic return means is provided for the carriage C comprising an air cylinder 144 (see FIGS. 1, 3 and 4) having a piston 146 therein and a piston rod 148 terminating in a head 150. A pin 152 extends from the head 150 and is adapted to enter an opening 153 in the traveler body 30 as shown in section in FIG. 5.

A cylinder head 154 is located at the right-hand end of the cylinder 144 and is shown in detail in FIG. 6. It has a port 156 connected by an air tube 158 and a fitting 100ª to the port 100. Within the cylinder head 154 an adjustable needle valve 160 and a pair of check valves 162 and 164 are provided for controlling the flow of air to and from the air cylinder 144 in a desirable manner as will hereinafter appear.

*Practical operation*

The initial position of the carriage C is shown dotted at $C^1$ in FIG. 1 and in this position both the projector rod 38 and the lubricant nozzle 50 are retracted when the air supply valve $V^3$ is closed, retraction of course being a result of expansion of the springs 46 and 64 respectively as shown in FIG. 7.

When the trolley wheels 14 are to be lubricated, the valve $V^3$ is opened whereupon air flows through the air line 90 and fitting 92 into the master valve $V^1$ which at this time is in the position shown in FIG. 2. Accordingly, the air flows into the valve body 96, then through the passageway 102, the port 98, the fitting 98ª, the air hose 142 and the fitting 140 into the lower end of the valve $V^2$ and the passageway 45 to the cylinder 44 to actuate the trolley engaging piston 42 before the valve 134, 136 is opened. In the valve $V^2$ the valve disc 136 is seated on the seat 134 as shown in FIG. 9 by reason of the spring 138 as the stem 137 is at this time in registry with the notch 139 (position 137ª in FIG. 3).

Expansion of the air in the cylinder 44 acts on the piston 42 to extend the projector rod 38 so that the trolley wheel engaging roller 40 thereon is in the path of the next approaching trolley wheel 14. When said wheel engages the roller 40 it moves the carriage C along the connecting rod 28 with the roller 34 riding the connecting bar 24. As soon as the stem 137 of the lubricator control valve leaves the notch 139, it is held depressed by the under surface of the connecting bar 22 to maintain the valve 134—136 open so that the air then also flows through a passageway 61 to the cylinder 62. The air flows slowly through this passageway (from right to left in FIG. 8) as it passes a check ball 65 therein that is normally seated against a seat 67. The seat 67 has a by-pass hole 69 to cause such slow flow so that the nozzle 50 does not violently strike the lubricant fitting 16 but approaches it slowly and gently contacts it, but may retract from the fitting 16 quickly, as will hereinafter appear.

Referring to FIG. 11, the compressed air introduced through the passageway 61 into the cylinder 62 causes forward motion of the sleeve 58 as it acts upon the piston 60 and this is accomplished against the tension of the relatively light spring 64, the heavy spring 82 at this time preventing the piston 80 from sliding the lubricant plunger 68 along the cylinder 66. The lubricant nozzle 50 is accordingly engaged against the lubricant fitting 16 of the trolley wheel 14 as illustrated. The parts are so designed that the nozzle is approximately in alignment with the fitting, and any slight misalignment is taken care of by the conical nose of the nozzle 50 and the floating mount of the nozzle in the sleeve 52 under the action of the balls 54 and the garter spring 56.

Once the nozzle is engaged with the fitting the air pressure will build up in the cylinder 62 and act on the lubricant piston 80 to move the plunger 68 along the bore 66 for discharging the charge of lubricant therein through the check valve 70, the inlet fitting 86 from the lubricant hose 88 being provided with the usual check valve to prevent reverse flow of the lubricant. The lubricant under pressure passes the valve 74 which is being held open by contact with the lubricant fitting 16, and the lubricant enters the fitting and the bearing to which it is attached. During the forward movement of the sleeve 58 in the cylinder 62, the inlet fitting 86 slides along a slot 87 (see FIGS. 1 and 5) in the body 30.

The lubricating operation continues past the solid line position C of the carriage in FIG. 1 and until it nears the dotted line position $C^2$. If everything is functioning properly the clip 130 propelling the spool 126—128 along the rod 112 will engage the spool with the washer 122, and after some compression of the spring 118 will slide the rod toward the right to reverse the position of the lubricator control valve $V^1$ from that shown in FIG. 2. Thereupon the valve block 108 connects the inlet 92 to the passageway 104 and the passageway 102 to the exhaust passageway 106 to bleed air from both cylinders 44 and 62, thus resulting in retraction of the projector rod 38 and the lubricant nozzle 50. Since the exhaust air flow through the passageway 61 is fast from the cylinder 62 to the fitting 140, the nozzle 50 is withdrawn quickly from the fitting 16. As the projector rod is retracted, the roller 40 carried thereby will become disengaged from the trolley wheel 14 thereby stopping the forward motion of the carriage C, and the air to the passageway 104 will flow out of the port 100 through the fitting 100$^a$, the air tube 158, the fitting 156$^a$ and the port 156 to the air cylinder 144. This flow is metered by the needle valve 160 (FIG. 6) and opens the check valve 162 whereupon the air acts on the piston 146 for extending the piston rod 148 toward the left in FIG. 4, thus causing the head 150 and the pin 152 to propel the carriage C in the return direction to its initial position $C^1$. Just prior to this position the spool 126—128 on the valve actuating rod 112 moves this rod again to the left through the washer 124 and compression of the spring 120 to again reverse the position of the master valve $V^1$. It is now in the FIG. 2 position again. This exhausts the air from the cylinder 144 through the check valve 164 of FIG. 6, and since the air does not have to pass the needle valve 160 it exhausts relatively quickly so as to ready the lubricator for the lubrication of the next trolley wheel 14 when it engages the roller 40, now in extended position by receiving air from the hose 142.

Of course when the stem 137 returns to the initial position 137$^a$ in FIG. 3, it is raised by the spring 138 for closing the valve 134—136 to prevent operation of the lubricator until it is moved a short distance from the $C^1$ position.

After all the trolley wheels on a trolley have been lubricated the valve $V^3$ may be closed to put the lubricator out of service and the projector rod 38 will retract under the action of the spring 46 so that the carriage will no longer be moved along its guide means by the trolley wheels 14 as they pass it. Whenever the valve $V^3$ is again opened, the lubricator is put back into automatic operation.

There is a possibility of malfunctioning such as sticking of the valve $V^1$, sticking of the piston 42 or breakage of the return spring 46 (FIG. 7) in which case the projector rod 38 would not be retracted and the trolley 14 would carry the carriage C against the end plate 18 and cause breakage of some parts of the lubricator. Therefore, if the carriage goes past its normally intended position where the valve $V^1$ is reversed from the position of FIG. 2, the roller 34 will register with the notch 36 in the connecting bar 24, and the carriage C will drop down by gravity to the dotted position shown at 30$^a$ in FIG. 5, which position is fully illustrated in FIG. 10. This dropping action is permitted without interference by the clip 130 and the pin 152 as the clip can slide off the spool 126—128 as in FIG. 10, and the roller can swing out of the notch 36 as indicated by the arrow B in FIG. 5. This results in the roller 40 swinging up out of the path of the trolley wheel 14, and the nozzle 50 swinging off the lubricant fitting 16, and the lubricator may remain in this safe position until the difficulty has been remedied and it is put back into service.

In the event the carriage C does not freely swing down as in FIG. 10, the body 30 will engage the safety cam 160 which will positively cam the carriage downwardly to the safety position.

From the foregoing description it will be obvious that we have provided a lubricator readily adapted to trolley wheels for automatically lubricating them as they pass the lubricator. Each bearing is lubricated with a predetermined quantity of lubricant, and pneumatic means automatically returns the lubricator to an initial position ready for the next trolley wheel that comes along. Provision is also made to take care of malfunctioning of our lubricator.

Some changes may be made in the construction and arrangement of the parts of our automatic trolley lubricator without departing from the real spirit and purpose of our invention, and it is our intention to cover by our claims any modified forms of structure or use of mechanical equivalents which may reasonably be included within their scope.

We claim as our invention:

1. In an automatic trolley lubricator, guide means arranged parallel to a trolley track, a carriage having an initial position on said guide means and movable therealong, pneumatically operated lubricating means on said carriage for lubricating a trolley wheel, pneumatically operated trolley engaging means on said carriage to move the carriage along said guide means in synchronism with a trolley, pneumatically operated means for moving said carriage in a return direction, a main valve actuated to two positions by said carriage at opposite limits of its movement relative to said guide means, a normally closed lubricator control valve between said main valve and said pneumatically operated lubricating means, one position of said main valve furnishing air to said lubricator control valve and said pneumatically operated trolley engaging means, cam means for opening said lubricator control valve when said carriage leaves said initial position whereupon it supplies air to said lubricating means for sequentially extending it to contact a lubricant fitting of the trolley wheel and thereafter operate said lubricating means to inject lubricant into the fitting, and the other position of said main valve actuating said pneumatically operated carriage moving means to return said carriage to initial position.

2. In an automatic trolley lubricator, guide means arranged parallel to a trolley track, a carriage having an initial position on said guide means and movable therealong, pneumatically operated lubricating means on said carriage for lubricating a trolley wheel, pneumatically operated trolley engaging means on said carriage to move the carriage along said guide means in synchronism with and by a trolley, a main valve actuated to two positions by said carriage at opposite limits of its movement relative to said guide means, a normally closed lubricator control valve between said main valve and said pneumatically operated lubricating means, a first position of said main valve furnishing air to said lubricator control valve and said pneumatically operated trolley engaging means, cam means for opening said lubricator control valve when said carriage leaves said initial position whereupon it supplies air to said lubricating means for sequentially extending it to contact a lubricant fitting of the trolley wheel and thereafter operate the lubricating means to inject lubricant into the fitting, the second position of said main valve cutting off air to said lubricator, and means for returning said carriage to initial position and thereupon moving said main valve to said first position.

3. In an automatic trolley lubricator, guide means arranged along a trolley track, a carriage having an initial position on said guide means and movable therealong, pneumatically operated lubricating means on said carriage for lubricating a trolley wheel, pneumatically operated trolley engaging means on said carriage to move the carriage along said guide means in synchronism with a wheel, pneumatically operated means for moving the carriage in a return direction, a main valve actuated to two positions by said carriage at opposite limits of its movement relative to said guide means, a normally closed lubricator control valve between said main valve and said pneumatically operated lubricating means, one position of said main valve furnishing air to said lubricator control valve and said pneumatically operated trolley engaging means, cam means for opening said lubricator control valve when said carriage leaves said initial position whereupon it supplies air to said lubricating means for sequentially extending it to contact a lubricant fitting of said trolley wheel and thereafter operate the lubricating means to inject lubricant into the fitting, and the other position of said main valve actuating said pneumatically operated carriage moving means to return said carriage to initial position, said lubricating means comprising a cylinder, a piston therein, lubricating cylinder and plunger means carried by said piston and including a nozzle, a relatively light spring for said piston and a relatively heavy spring for said lubricating plunger, both pistons being subjected to the air pressure entering said cylinder whereby said lubricant nozzle is extended against the action of said light spring to contact said lubricant nozzle with a lubricant fitting of the trolley wheel and the lubricating plunger is then extended against the action of said heavy spring for injecting lubricant into the fitting.

4. An automatic trolley lubricator comprising guide means, a carriage having an initial position on said guide means and movable therealong, pneumatically operated lubricating means on said carriage for lubricating a trolley wheel, pneumatically operated trolley engaging means on said carriage to move the carriage along said guide means in synchronism with a trolley, pneumatically operated means for moving the carriage in a return direction, a main valve actuated to two positions by said carriage at opposite limits of its movement relative to said guide means, a normally closed lubricator control valve between said main valve and said pneumatically operated lubricating means, one position of said main valve furnishing air to said lubricator control valve and said pneumatically operated trolley engaging means, cam means for opening said lubricator control valve when said carriage leaves said initial position to supply air to said lubricating means for operating it, and the other position of said main valve actuating said pneumatically operated carriage moving means to return said carriage to initial position, said lubricating means comprising a cylinder, a piston therein, lubricating cylinder and plunger means carried by said piston and including a nozzle, a relatively light spring for said piston and a relatively heavy spring for said lubricating plunger, both pistons being subjected to the air pressure entering said cylinder whereby said lubricant nozzle is extended against the action of said light spring to contact said lubricant nozzle with a lubricant fitting of the trolley wheel and the lubricating plunger piston is then extended against the action of said heavy spring for lubricating purposes.

5. In an automatc trolley lubricator, guide means arranged parallel to a trolley track, a carriage having an initial position on said guide means and movable therealong, pneumatically operated lubricating means on said carriage for lubricating a trolley wheel, said last means being pneumatically extendable, pneumatically operated trolley engaging means on said carriage to move the carriage along said guide means in synchronism with a trolley, pneumatically operated means for moving said carriage in a return direction, a main valve actuated to two positions by said carriage at opposite limits of its movement relative to said guide means, one position of said main valve admitting air to said trolley engaging means to extend it to a position in the path of a trolley wheel, a normally closed lubricator control valve on said carriage, a cam coacting with said lubricator control valve to open it upon movement of the carriage away from said initial position and thereupon admitting air to first extend said lubricating means to contact a lubricant fitting of the trolley wheel and then operate said lubricating means to inject lubricant into the fitting, the other position of said main valve actuating said pneumatically operated carriage moving means to return the carriage to said initial position, said carriage being pivoted on said guide means, means for normally supporting it in operative position, said last means upon excessive movement of said carriage along said guide means, having provision to no longer support said carriage in operative position whereby it pivots by gravity to a position removing said trolley engaging means from the path of a trolley and said lubricating means from the lubricant fitting of the trolley wheel in case of malfunctioning.

6. In an automatic trolley lubricator, guide means arranged parallel to a trolley track, a carriage having an initial position on said guide means and movable therealong, pneumatically operated lubricating means on said carriage for lubricating a trolley wheel, said last means being pneumatically extendable, pneumatically operated trolley engaging means on said carriage to move the carriage along said guide means in synchronism with a trolley, pneumatically operated means for moving the carriage in a return direction, a main valve actuated to two positions by said carriage at opposite limits of its movement relative to said guide means, one position of said main valve admitting air to said trolley engaging means to extend it to a position in the path of a trolley wheel, a normally closed lubricator control valve on said carriage, a cam coacting with said lubricator control valve to open it upon movement of the carriage away from said initial position and thereupon admitting air to first extend said lubricating means to contact a lubricant fitting of the trolley wheel and then operate said lubricating means to inject lubricant into the fitting, the other position of said main valve actuating said pneumatically operated carriage moving means to return the carriage to said initial position, said carriage being pivoted on said guide means and having a roller traveling along a track of said guide means, said track having a notch therein to permit disassociation of said roller from said track whereupon the lubricator pivots downwardly by gravity and results in withdrawing said trolley engaging and lubricating means from association with the trolley.

7. In an automatic trolley lubricator, guide means arranged parallel to a trolley track, a carriage having an initial position on said guide means and movable therealong, pneumatically operated lubricating means on said carriage for lubricating a trolley wheel, pneumatically operated trolley engaging means on said carriage to move the carriage along said guide means in synchronism with a trolley, pneumatically operated means for moving said carriage in a return direction, a main valve actuated to two positions by said carriage at opposite limits of its movement relative to said guide means, a lubricator control valve between said main valve and said pneumatically operated lubricating means, said lubricator control valve being carried by said carriage and closed in the initial position thereof, one position of said main valve furnishing air to said lubricator control valve and said pneumatically operated trolley engaging means, cam means cooperating with said lubricator control valve to open it upon said carriage leaving said initial position whereupon said lubricator control valve supplies air to said lubricating means for sequentially extending it to contact a lubricant fitting of the trolley wheel and thereafter operating said lubricating means to inject lubricant into the fitting, the other position of said main valve actuating said pneumatically operated carriage moving means to return said carriage to initial position, and means between said lubricator control valve and said lubricating means to permit slow flow of air thereto for preventing violent engagement of said nozzle with said lubricant fitting and fast flow of air therefrom.

8. In an automatic trolley lubricator, guide means arranged parallel to a trolley track, a carriage having an initial position on said guide means and movable therealong, pneumatically operated lubricating means on said carriage for lubricating a trolley wheel, said last means being pneumatically extendable, pneumatically operated trolley engaging means on said carriage to move the carriage along said guide means in synchronism with a trolley, pneumatically operated means for moving said carriage in a return direction, a main valve actuated to two positions by said carriage at opposite limits of its movement relative to said guide means, one position of said main valve admitting air to said trolley engaging means to extend it to a position in the path of a trolley wheel, a normally closed lubricator control valve on said carriage, a cam coacting with said lubricator control valve to open it upon movement of the carriage away from said initial position and thereupon admitting air to first extend said lubricating means to contact a lubricant fitting of the trolley wheel and then operate said lubricating means to inject lubricant into the fitting, the other position of said main valve actuating said pneumatically operated carriage moving means to return the carriage to said initial position, said carriage pivoting on said guide means upon excessive movement of said carriage therealong to remove said trolley engaging means from the path of a trolley and said lubricating means from the lubricant fitting of the trolley wheel in case of malfunctioning, and cam means engaged by said carriage to positively pivot said carriage on said guide means if gravity fails to do so.

9. In an automatic trolley lubricator, guide means, a carriage having an initial position thereon and movable therealong, pneumatically operated lubricating means on said carriage for lubricating a trolley wheel, said last means being pneumatically extendable, pneumatically operated trolley engaging means on said carriage to cause a trolley to move said carriage along said guide means, pneumatically operated means for moving the carriage in a return direction, a valve actuated to two positions by said carriage at opposite limits of its movement relative to said guide means, one position of said valve admitting air to said trolley engaging means to extend it to a position in the path of a trolley wheel, a normally closed lubricator control valve on said carriage, a cam coacting with said lubricator control valve to open it upon movement of the carriage away from said initial position and thereupon admitting air to first extend said lubricating means and then operate said lubricating means, the other position of said valve actuating said pneumatically operated carriage moving means to return the carriage to said initial position, said carriage pivoting on said guide means by gravity upon excessive movement of said carriage therealong to a safety position wherein said trolley engaging means is removed from the path of a trolley and said lubricating means is removed from the lubricant fitting of the trolley wheel in case of malfunctioning, and cam means engageable with said carriage to positively pivot it to said safety position.

10. In an automatic trolley lubricator, guide means, a carriage having an initial position thereon and movable therealong, pneumatically operated lubricating means on said carriage for lubricating a trolley wheel, pneumatically operated trolley engaging means on said carriage to enable the trolley to move said carriage along said guide means, pneumatically operated means for moving the carriage in a return direction, a main valve actuated to two positions by said carriage at opposite limits of its movement relative to said guide means, a normally closed lubricator control valve carried by said carriage and located between said main valve and said pneumatically operated lubricating means, one position of said main valve furnishing air to said lubricator control valve and said pneumatically operated trolley engaging means, cam means for opening said lubricator control valve by said carriage leaving said initial position whereupon it supplies air to said lubricating means for sequentially extending it and thereafter operating said lubricating means, the other position of said main valve actuating said pneumatically operated carriage moving means to return said carriage to initial position, said lubricating means comprising a cylinder, a piston therein, lubricating cylinder and plunger means carried by said piston and including a nozzle, a relatively light spring for said piston and a relatively heavy spring for said lubricating plunger, both pistons being subjected to the air pressure entering said cylinder whereby said lubricant nozzle is extended against the action of said light spring to contact said lubricant nozzle with a lubricant fitting of the trolley wheel and the lubricating piston is then extended against the action of said heavy spring for injecting lubricant into the fitting.

11. An automatic trolley lubricator comprising guide means arranged parallel to a trolley track, a carriage having an initial position on said guide means and movable therealong, pneumatically operated lubricating means on said carriage for lubricating a trolley wheel, said last means being pneumatically extendable, pneumatically operated trolley engaging means on said carriage to engage a moving trolley whereby said carriage is moved along said guide means by the trolley, pneumatically operated means for moving the carriage in a return direction, and a main valve actuated to two positions by said carriage at opposite limits of its movement relative to said guide means, one position of said main valve admitting air to said trolley engaging means to extend it to a position in the path of a trolley, a lubricator control valve for extending said lubricating means to contact a lubricant fitting of the trolley wheel, a cam coacting with said lubricator control valve to open it upon movement of said carriage away from said initial position to extend said lubricating means and then operate said lubricating means, the other position of said main valve admitting air to said pneumatically operated carriage moving means to return the carriage to said initial position, said carriage moving means including a valving arrangement for permitting slow controlled flow of air to said air cylinder and relatively fast exhaust of air therefrom while said carriage is being moved along said guide means by the trolley through said trolley engaging means.

References Cited in the file of this patent
UNITED STATES PATENTS

| | | |
|---|---|---|
| 2,502,659 | Livingston | Apr. 4, 1950 |
| 2,624,423 | Moore | Jan. 6, 1953 |
| 2,658,585 | Klein et al. | Nov. 10, 1953 |